United States Patent Office 2,840,717
Patented June 24, 1958

2,840,717

METHOD OF DETERMINING THE POROSITY OF CORE SAMPLES

Leendert de Witte, Ponca City, Okla., assignor to Continental Oil Company, Ponca City, Okla., a corporation of Delaware No Drawing. Application January 9, 1953
Serial No. 330,589

5 Claims. (Cl. 250—83)

This invention relates to a method for the investigation and determination of the nature of various bodies by radiological means involving the use of neutrons. More particularly, the invention relates to an improved method for determining the porosity of earth formations, by bombarding an earth core sample with a beam of fast neutrons and detecting the slow neutrons emanating therefrom, or alternatively, detecting the gamma rays induced in the sample by neutron capture.

In the calculation of the potential production from petroleum containing formations, it is necessary to know the proportion of the interstitial space volume in such formations which is available for oil and gas storage. Thus it is necessary to know the total porosity of the sand or limestone formations comprising the petroliferous reservoir. To obtain such information, it is customary in the drilling of oil wells to cut cores from the formation penetrated. These are useful in identifying the formations which may be oil bearing and determining the productivity which might be expected of various formation horizons encountered in the well. Core samples taken in the well under pressure may contain gas, oil, and connate water and may be contaminated as well by the drilling fluid.

Soils, limestones, shales, sandstones, and other fractured and vugular formations containing minute amounts of hydrogenous materials cannot be accurately analyzed except by means of time-consuming attenuated procedures. Furthermore, porosities obtained from the measurements made on small samples are not representative of the formation, and porosity analyses on large samples encounter great difficulty in cleaning the samples so that all open pore space can be measured.

It is therefore one object of this invention to provide a simple, rapid method by which accurate porosity analyses may be made.

A further object of the invention is to provide a simple, rapid method of determining the porosity of large core samples by means of detection of slow neutrons emanating from a sample bombarded by a beam of fast neutrons.

Another object of this invention is to provide a simple, rapid method of determining the porosity of core samples by means of detection of gamma rays inducted in the samples by neutron capture.

A still further object of the invention is to provide a preparatory treatment of the core sample whereby the above objects may be attained expeditiously.

Other objects of the invention will appear as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

Neutrons may be produced by the action of a radioactive substance such as radium, radon, polonium, and the like on a substance such as beryllium, lithium, and the like. Thus, for example, beryllium emits neutrons when impinged upon by alpha particles emanating from radium. A radium-beryllium mixture is therefore a convenient source of neutrons. The neutrons emitted from any such source have an extremely high velocity, corresponding to energy values averaging between $1 \times 10^6$ and $10 \times 10^6$ electron volts, and are called fast neutrons. Fast neutrons have the property of passing freely through heavy elements, that is, elements of higher atomic weight, which are not pervious to any considerable depth to radiations of other types, such as alpha, beta, and even gamma rays. On the other hand, light elements of low atomic weights, and especially hydrogen, have the property of greatly decreasing the velocity of the neutrons. Neutrons whose velocity has been reduced by collision with low atomic weight elements are known as slow neutrons. The passage of neutrons through substances comprising high atomic weight elements thus results principally in scattering or diffusing these neutrons while the passage of neutrons through substances comprising low atomic weight elements results in both slowing down and scattering such neutrons.

Since neutrons carry no electric charge they cannot be directly detected by ordinary means, such as Geiger-Mueller counters and ionization chambers, used for the detection of other radioactive emanations. However, certain elements and compounds thereof, such as cadmium, lithium, boron, boron trifluoride, and the like which are substantially insensitive to the effect of fast neutrons, have the property of disintegrating when impinged upon by slow neutrons with an accompanying emission of alpha or gamma particles. By placing such disintegratable elements in the vicinity of Geiger counter or ionization chamber detectors, as, for example, by coating the walls of the latter with cadmium or by filling them with boron trifluoride. these detectors may be used for the detection of slow neutrons. For a neutron radiation source of any given intensity, the number of slow neutrons reaching such a detector will be substantially a function of the amount of hydrogen atoms present in the medium traversed by the path of neutrons to the detector. The number of slow neutrons emanating from an irradiated sample can be accurately measured by observing or recording the indications of a properly calibrated detector. This method can thus be used for determing the presence and quantity of substances containing hydrogen, such as water, hydrocarbon liquids and gases, and the like in cases where more direct measurements are difficult or impossible.

The total porosity of a core sample saturated with any hydrogen-containing material can thus be readily ascertained by the above recited method.

Porosity of core samples impregnated with hydrogen-containing material can also be determined by measurement of gamma rays induced by neutrons captured in the sample. The intensity of these gamma rays is proportional to the amounts of neutrons captured in the sample. As only slow neutrons are captured, the amount of neutron capture is again dependent upon the slowing down of the fast neutrons from the source by hydrogen or a hydrogen-bearing material. The induced gamma ray intensity is thus a function of the hydrogen content of the sample and since it may be measured with a conventional Geiger-Mueller tube or ionization chamber the porosity of the samle may be determined therefrom. The intensity of gamma rays induced by captured neutrons varies somewhat depending upon the element which captures the neutrons so that this method of determining porosity is dependent in part upon the chemical composition of the sample and is less desirable than the slow neutron method. When using the induced gamma ray method a polonium-beryllium neutron source, which is essentially free of gamma rays, should preferably be used.

Difficulty is encountered in the practice of both of these methods, however, due to the tendency of the naturally-occurring hydrogen-containing fluids to escape from fractures and vugs near the surface of the core sample.

I have discovered that this latter difficulty may be simply and expeditiously overcome by saturating the core sample with a hydrogen-containing material which is solid or non-flowing at normal temperatures. The above described types of porosity measurement require only that all of the pores be filled with hydrogenous compounds in the form of hydrocarbons and/or water. Therefore, according to my invention, the core samples do not require any cleaning whatsoever as do samples tested for porosity by prior conventional methods. Any naturally-occurring interstitial water or hydrocarbon gas or oil will be entrapped by the impregnating material. Variations in the hydrogen density between water, crude oil, brines, and my normally solid impregnant are so slight that there is no appreciable differing effect upon neutrons passing therethrough.

The impregnant may be any normally solid or non-flowing low-melting point hydrogen-bearing organic material. Admirably suited and readily available are the lower melting point paraffin waxes obtained from petroleum refining processes. Another suitable material is napalm, a gelled composition of gasoline with soaps of naphthenic and palmitic acids described in U. S. Patent 2,606,107 issued to Louis F. Fieser on August 5, 1952.

In the practice of this invention the core sample under investigation is immersed into a molten bath of the impregnating hydrogen-containing material to thoroughly saturate the sample. Preferably, the impregnation is carried out under vacuum followed by sufficient applied pressure to fill all of the effective pore space of the sample. The saturated core is then removed from the molten bath and immediately cooled so as to solidify the impregnant in situ in the interstices of the core. The impregnated core sample is then subjected to neutron radiation, detection of slowed neutrons, and determination of the porosity thereof based on the length of the path traversed through the sample.

A beam of fast neutrons of known intensity and cross-sectional area is directed through the saturated sample. The neutrons that are not captured but which are slowed by passing through the sample are detected with a neutron counter. Since the capturing of the fast neutrons is dependent upon the retarding action of hydrogen on the neutrons, the slow neutron detection is a measure of the amount of hydrogen in the sample, and because all of the pore space is filled with hydrogen-bearing material, either naturally occurring or from my impregnant, the slow neutron detection and the detection of gamma rays induced in the sample by captured neutrons are both measures of the total porosity of the core sample.

Measurements are made with conventional equipment calibrated for any size or shape of sample. The fast neutron beam is directed to the impregnated core sample by the use of proper shielding around the source. The very weak neutrons which undergo too much scattering within the sample, that is, are deviated too much from the path of the beam, can be eliminated by a paraffin shield between the sample and the detector. The response output of the detector may be fed into a suitable amplifier and recorder so that the characteristics of a given sample may be readily obtained in graphical form from which the porosity is easily read. The irradiation, detection, and recording apparatus may be calibrated for use by placing a paraffin block of the same geometry as the core in the sample position and recording its "porosity," the value obtained being equivalent to 100 percent porosity. Another means is to employ cores having a known porosity as determined on cleaned cores by conventional methods, a series of these cores being impregnated with paraffin wax and measured, thus providing a scale range with which the measurement of an unknown sample prepared by my procedure may be readily interpolated.

It is apparent that many modifications and variations of the invention as hereinbefore set forth may be made without departing from the spirit and scope thereof. The specific embodiment described is given by way of example only and the invention is limited only by the terms of the appended claims.

I claim:

1. The method of determining the porosity of a core sample which comprises the steps of impregnating the core sample with a normally non-flowing hydrogen-bearing organic material to saturate the same, directing a beam of fast neutrons of known intensity and cross sectional area through the saturated core, detecting the slow neutrons emanating from said core wherein said slow neutrons are the result of the deceleration of the fast neutrons passing through the organic saturant and the hydrogen-bearing compounds naturally present in said core sample, and then determining the porosity of said core sample by comparing the measured intensity of the slow neutrons emanating from said core to the measured intensity of slow neutrons emanating from a standard of known porosity.

2. The method of determining the porosity of a core sample which comprises the steps of immersing the core into a molten bath of a normally non-flowing hydrogen-bearing organic material to saturate the same, cooling the saturated core to solidify the organic material, directing a beam of fast neutrons of known intensity and cross sectional area through the saturated core, detecting the slow neutrons emanating from said core wherein said slow neutrons are the result of deceleration of the fast neutrons passing through the organic saturant and the hydrogen-bearing compounds naturally present in said core sample, and then determining the porosity of said core sample by comparing the measured intensity of slow neutrons emanating from said core to the measured intensity of slow neutrons emanating from a standard of known porosity.

3. The method of determining the porosity of a core sample taken from a well bore which comprises the steps of immersing the core into a molten bath of a normally non-flowing hydrogen-bearing organic material to saturate the same, thoroughly cooling the saturated bore to solidify the organic material in situ, directing a beam of fast neutrons of known intensity and cross sectional area through said saturated core, detecting the slow neutrons emanating from said core wherein said slow neutrons are the result of the deceleration of the fast neutrons passing through the organic saturant and the hydrogen-bearing compounds naturally present in said core sample, and then determining the porosity of said core sample by comparing the measured intensity of the slow neutrons emanating from said core to the measured intensity of slow neutrons emanating from a standard of known porosity.

4. The method of determining the porosity of a core sample taken from a well bore which comprises the steps of immersing the core into a molten bath of a normally solid, non-flowing, low-melting point hydrogen-bearing organic material to saturate the same, thoroughly cooling the saturated core to solidify the organic material in situ in the interstices of the core, directing a beam of fast neutrons of known intensity and cross sectional area through said saturated core, detecting the slow neutrons emanating from said core wherein said slow neutrons are the result of the deceleration of the fast neutrons passing through the organic saturant and the hydrogen-bearing compounds naturally present in said core sample, and then determining the porosity of said core sample by comparing the measured intensity of the slow neutrons emanating from said core to the measured intensity of slow neutrons emanating from a standard of known porosity.

5. The method of determining the porosity of a core sample taken from a well bore which comprises the steps of immersing the core into a molten bath of a normally solid, non-flowing, low-melting point hydrocarbon to saturate the same thoroughly, removing the saturated core from the molten bath, immediately cooling the saturated core to solidify the organic material in situ in the interstices of the core, directing a beam of fast neutrons of known intensity and cross sectional area through said saturated core, detecting the slow neutrons emanating from said core wherein said slow neutrons are the result of the deceleration of the fast neutrons passing through the organic saturant and the hydrogen-bearing compounds naturally present in said core sample, and then determining the porosity of said core sample by comparing the measured intensity of the slow neutrons emanating from said core to the measured intensity of slow neutrons emanating from a standard of known porosity.

References Cited in the file of this patent

UNITED STATES PATENTS

| | | |
|---|---|---|
| 2,231,577 | Hare | Feb. 11, 1941 |
| 2,334,262 | Hare | Nov. 16, 1943 |
| 2,390,433 | Fearon | Dec. 4, 1945 |
| 2,443,680 | Herzog | June 22, 1948 |
| 2,520,058 | Reichertz | Aug. 22, 1950 |
| 2,667,583 | Herzog | Jan. 26, 1954 |
| 2,680,201 | Scherbatskoy | June 1, 1954 |